United States Patent Office 3,342,582
Patented Sept. 19, 1967

3,342,582
PLANT DEFOLIATION PROCESS AND COMPOSITION
Hyman Iserson, Erdenheim, Pa., and Herbert Q. Smith, Trenton, N.J., assignors to Pennsalt Chemicals Corporation, Philadelphia, Pa., a corporation of Pennsylvania
No Drawing. Filed Jan. 8, 1964, Ser. No. 336,357
14 Claims. (Cl. 71—70)

ABSTRACT OF THE DISCLOSURE

The process of treating plants to obtain a defoliative effect by contacting the plants with a compound of the structure $$R_1-(C=C-)_n R_2$$
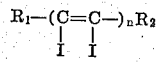

where $R_1$ is hydrogen, hydroxymethyl or halomethyl, and $n$ is from 1 to 2. The invention also embodies defoliating compositions with the above described compounds as active agents.

---

The defoliation of plants and crops is of high economic importance in agricultural and forestry operations. Defoliation of plants is desirable to increase the value of the crops from such plants either by hastening maturity, improving the grade of the fruit, and the like. In the case of cotton plants defoliation at the proper stage in their life is highly desirable in order to expose the lower bolls, which in luxuriant plants are made inaccessible to sunlight which is needed for the ripening process. In addition, defoliation of the cotton plant leaves enables cotton picking to be made much more efficient either by hand or by machine. Defoliation of cotton has additional advantages. For example, the removal of the cotton plant leaves causes a reduction in the number of bolls and thereby reduces the food supply available to the boll weevil prior to its entering a state of hibernation. As a consequence, there is a definite reduction in the number of such pests which are able to live through the winter months and which emerge to do subsequent damage. Defoliation of citrus trees, and also peach trees, plum trees, apple trees and other types of trees is also important in order to remove a certain number of the leaves and thereby more or less force the maturity of the plant or its fruit. Likewise, string beans, soya beans and other vegetables and crop plants are frequently subjected to defoliation in order to make harvesting easier.

Close observation of defoliant action has indicated that the actual dropping of the leaves is the result of normal processes carried out by the plant as a result of injured leaf tissues. These processes go into effect whenever the leaves are sufficiently injured so that plant functions are seriously impaired. When such a condition is reached the plant causes an abscission layer composed of meristematic cells to be grown across the base of the petiole. These cells lack cohesion and in effect produce a cut through the petiole leaving the vascular bundles intact. These bundles are so weak, however, that the weight of the leaf or a slight breeze is sufficient to disengage the leaf. Artificial defoliation is achieved by applying to the leaf a material which will injure it sufficiently to cause the formation of an abscission layer. Natural defoliation which occurs in plants is the result of leaf injury caused by changes in temperature, insects, disease and the like. Heretofore, artificial defoliation was obtained by application to the plant leaves those materials which cause leaf injury and frequently killing of leaf cells which resulted in a so-called burning effect of the leaves. This burning effect is observed in a complete drying and browning of the leaf tissues prior to their falling from the plant and frequently the artificial defoliants used heretofore cause the burning and browning without actual dropping of the leaves. Thus, many chemical compositions used heretofore to induce defoliation caused plant injury and deformation of the leaf, but actually were poor defoliants because leaf dropping occurred only to a small extent.

It has now been found by means of this invention that defoliation of plant crops may be achieved in a manner closely akin to the natural defoliation processes in that no visible cell killing is in evidence and little or no burning of the leaf tissues is observed. Furthermore, by means of the process of this invention defoliant activity is achieved very rapidly and a highly efficient defoliation procedure is achieved.

In accord with this invention there is provided a process for the defoliation of plants whereby said plants are treated with a defoliant active amount of a compound corresponding to the structure

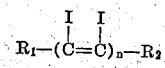
$$R_1-(C=C)_n-R_2$$

where $R_1$ is a member selected from the group consisting of hydrogen, hydroxymethyl and halomethyl, $R_2$ is a member selected from the group of hydroxymethyl and halomethyl, and $n$ is an integer from 1 to 2.

The procedures that will be used for applying the defoliant compositions to the plants will be in accord with the usual practices. Since the active compositions will generally have limited water solubility, they will be employed either as solutions in organic solvents or they will be applied to the plants as an aqueous dispersion or emulsion. When an organic system is employed, the organic solvent will generally be an aromatic hydrocarbon solvent such as xylene or toluene, but any conventional solvent system may be used, as, for example, ketones (methylethyl ketone, acetone, cyclohexanone, etc.), petroleum oils, aliphatic amides such as dimethylformamide, ketoalcohols (e.g. diacetone alcohol), and the like.

In a preferred embodiment of the invention a concentrate of the active agent in an organic solvent will be manufactured and sold as an article of commerce. This concentrate is simply diluted with water just prior to use to form an aqueous dispersion of the active agent and the dispersion is readily sprayed onto the foliage of the plant to be treated by any of the conventional techniques. In general, the concentrate of active agent will contain from about 5% to 50% by weight of agent, the balance being the organic solvent and a surfactant such as an alkyl aryl polyether alcohol, an organic sulfonate, or other type which will enable the formulation to be readily dispersed into an aqueous system. In use, the concentrate will be added to water with agitation so that the concentration of active agent in the aqueous dispersion will be between about 0.1% and 30% and this aqueous system is then immediately ready for application to the plant. The concentrate can also be diluted with a suitable oil for spray application.

Alternatively, the active agent may be placed on a solid carrier rather than in the liquid carrier as described above. Solid carriers may be applied directly to the plants by dusting or they may be in the form of wettable or dispersible powders which likewise may be added to aqueous or organic solvent systems for application by conventional spray techniques. The concentration of active agent on the carrier will likewise vary between about 5% and 20% by weight of the total composition.

The rate of application of the active agent onto the crops to be treated will vary between about 0.05 and about 15 pounds of active agent per acre. Lower rates can be used on more sensitive plants such as beans, while higher amounts can be used on less sensitive cotton and woody plants.

As indicated by the structure given above the active agents for use in the process of this invention are organic iodides wherein the iodine atom is linked to carbon through a covalent bond. These compounds are prepared by techniques which involve the addition of iodine to an acetylenic bond. Where the active agents are those in which $n$ in the above structure is 1, the starting material will be the appropriate butyne or propyne and in the case where $n$ is 2 the appropriate acetylenic compound will be a 2,4-hexadiyne or pentadiyne. In order to more clearly and more fully illustrate the invention the following examples are given:

*Example 1.—1,4-dihydroxy-2,3-diiodo-2-butene*

2-butyne-1,4-diol (43 g., 0.5 mole) was added with stirring at room temperature to 1500 ml. $H_2O$, 172 g. (0.965 mole) KI and 129 g. (0.507 mole) $I_2$. The reaction mixture was heated 3½ hrs. on a steam bath, cooled and filtered. After drying, the crude product weighed 170 g., M.P. 173–176° (100% conversion and yield). Recrystallization (1 part crude/70 parts $H_2O$) of 50 g. gave 40 g., M.P. 179–180°.

*Example 2.—1,6-dihydroxy-2,3,4,5-tetraiodo-2,4-hexadiene*

2,4-hexadiyne-1,6-diol, 22 g. (0.2 mole) was added portionwise with stirring to 137.6 g. KI (0.83 mole) and 104.2 g. $I_2$ (0.41 mole) in 1500 ml. $H_2O$. The mixture was then heated on a steam bath for 6¼ hrs., cooled and the liquid was decanted off. The residual tar-like solid was dissolved in 550 ml. acetone. The acetone solution was diluted with $H_2O$ to give an oil which was extracted with ether. Addition of $CCl_4$ caused the precipitation of a yellow solid which was filtered off and air dried. Wt.=32 g. (38.6% conversion). Recrystallization of a portion of this product from water gave a white solid, M.P. 95–96°. Another portion of the crude was recrystallized from xylene, washed with aqueous $NaHSO_3$ and dried.

*Analysis.*—Found: C, 11.84%; H, 1.11%; I, 82.70%. Calculated: C, 11.65%; H, 0.97%; I, 83.60%.

*Example 3.—1-hydroxy-2,3-diiodo-2-propene*

Ten grams (0.18 mole) of propargyl alcohol was added, with stirring at room temperature, to 800 ml. of water containing 26 g. (0.16 mole) of potassium iodide and 45.7 g. (0.18 mole) of iodine. The reaction mixture was heated on a steam bath for 3 hours and cooled. Red-brown needles were collected, 48.0 g. (86%); M.P. 51–52°. The product was recrystallized from ether-petroleum ether by chilling the solution. Light yellow needles were obtained, 34.5 g. of M.P. 51.5–52.5° and 21 g. of M.P. 49–50°. The total conversion was 66%.

*Analysis.*—Found: C, 11.62%; H, 1.12%; I, 82.34%. Calculated for $C_3H_4I_2O$: C, 11.62%; H, 1.30%; I, 81.87%.

*Example 4.—1,4-dichloro-2,3-diiodo-2-butene*

Ten grams (0.081 mole) of 1,4-dichloro-2-butyne was heated at 80° with 20.6 g. (0.081 mole) of iodine for 18 hr. The reaction mixture was cooled, and dissolved in 250 ml. of ethyl acetate. The solution was washed with 5% sodium bisulfite solution (2×100 ml.), some of the solvent was removed and the product crystallized giving 20 g. (65% conversion), M.P. 121–122°. Lit. M.P. 121–123°.

*Example 5.—1-hydroxy-4-chloro-2,3-diiodo-2-butene*

To a solution of 5 grams (0.048 mole) of 4-chloro-2-butynol in 20 ml. of carbon tetrachloride was added a solution of 12.0 g. (0.048 mole) of iodine in 200 ml. of carbon tetrachloride. The solution was allowed to stand at room temperature for 3 days. Fine needles contaminated with free iodine were collected. The needles were air-dried (removing traces of free iodine) giving 5.8 g. of light yllow needles, M.P. 89–90°. The dark violet mother liquor was allowed to stand for an additional 2 days, then was concentrated at room temperature under reduced pressure to give additional product, wt. 8.0 g., M.P. 89–90°. Totatl conversion was 13.8 g., 64%.

*Analysis.*—Found: I, 70.76%; Cl, 9.31%. Calculated for $C_4H_5ClI_2O$: I, 70.84%; Cl, 9.90%.

*Example 6.—1-hydroxy-2,3,4-triiodo-2-butene*

Twenty grams (0.19 mole) of 4-chloro-2-butyn-1-ol was added to 1000 ml. of an aqueous solution of 48.2 g. (0.19 mole) of iodine and 31.5 g. (0.19 mole) of potassium iodide. The reaction mixture was stirred at room temperature for 6 hrs. The resulting yellow crystalline product was collected and air-dried, weight 45 g., M.P. 78–80°. The mother liquor was allowed to stand for 2 days and 3.5 g. of additional product was obtained. The combined material was recrystallized from dilute ethanol to give light yellow needles, wt. 38.5 g. (40.5% conversion), M.P. 82–84°.

*Analysis.*—Found: C, 10.79%; H, 1.11%; I, 83.06%. Calculated for $C_4H_5I_3O$: C, 10.68%; H, 1.12%; I, 84.70%.

*Example 7.—Formulations*

Formulations for use of the active agents are prepared as follows:

(7–A) *Aqueous grinding.*—Ten parts by weight of 1,4-dihydroxy-2,3-diiodo-2-butene and 90 parts by weight of water were ball milled until a stable dispersion was obtained.

(7–B) *Aqueous dispersions from ketone solution concentrates of active agent.*—Ten parts by weight of 1,6-dihydroxy-2,3,4,5-tetraiodo-2,5-hexadiene were dissolved in 85 parts by weight of acetone and 5 parts by weight of an alkyl aryl polyether alcohol surfactant ("Triton" X–155). This formulation was a clear, homogeneous, light brown liquid which was stable to storage and useful as an article of commerce. For use, the concentrate was added to water to give an aqueous dispersion ready for spraying onto foliage of plants.

(7–C) *Hydrocarbon concentrates.*—Ten parts by weight of 1-hydroxy-2,3-diiodo-2-propene was dissolved in 85 parts of xylene and 5 parts of surfactant ("Triton" X–155) added. The clear, homogeneous, light brown liquid was storage stable and ready for use by addition to water to give a sprayable dispersion of the active agent.

(7–D) A formulation was prepared as above containing 10 parts of 1,4-dihydroxy-2,3-diiodo-2-butene and 90 parts of dimethylformamide.

(7–E) *Wettable powder:*

| | Percent |
|---|---|
| 1,4-dihydroxy-2,3-diiodo-2-butene | 50 |
| Surfactant ("Marasperse" N) | 2 |
| Surfactant (Igepon) | 2 |
| Carrier (Attaclay) | 46 |

*Example 8.—Evaluation*

Plant response data for the defoliants were obtained by spraying formulations on one week old black Valentine bean plants at rates of one-tenth (0.1), and 1.0 pound per acre, and the plant response effect observed over a three-week period. The following table indicates the results obtained.

TABLE I

Defoliant Activity of $R_1-\left(\underset{\underset{I}{|}}{C}=\underset{\underset{I}{|}}{C}\right)_n-R_2$ on Black Valentine Beans

| Compound | | | Formulation | Percent Abscission Rate per Acre | | Comments |
|---|---|---|---|---|---|---|
| $R_1$ | $n$ | $R_2$ | | 0.1 lb. | 1.0 lbs. | |
| HOCH$_2$— | 1 | —CH$_2$OH | Aqueous ball-milled dispersion | 100% in 14 days | 25% in 7 days; 100% in 14 days. | No desiccation. |
| HOCH$_2$— | 1 | —CH$_2$OH | Aqueous dispersion from dimethylformamide concentrate. | 87.5% in 14 days; 100% in 21 days. | 100% in 14 days | Do. |
| HOCH$_2$— | 1 | —CH$_2$OH | Solution in hydrocarbon oil made from dimethylformamide concentrate. | 100% in 21 days | do | Do. |
| HOCH$_2$— | 2 | —CH$_2$OH | Aqueous dispersion from acetone solution | 37.5% in 14 days; 62.5% in 21 days. | 87.5% in 14 days; 100% in 21 days. | Do. |
| H— | 1 | —CH$_2$OH | Aqueous dispersion from xylene concentrate | 87.5% in 14 days; 100% in 21 days. | 100% in 14 days | Do. |
| ClCH$_2$— | 1 | —CH$_2$Cl | do | 100% in 21 days | do | Very slight browning of leaves after seven days at higher dose rate. |
| ClCH$_2$— | 1 | —CH$_2$OH | do | 100% in 14 days | do | |
| I—CH$_2$ | 1 | —CH$_2$OH | Solution in oil from acetone concentrate | do | do | |

It will be observed from the data in the above table that the defoliant activity obtained in accordance with the procedures and formulations of this invention is achieved without burning the leaves. This is indicated by the lack of any significant desiccation as shown during the tests. Furthermore, observation of the defoliated plants shows no evidence of plant kill and the general effect of the defoliant activity is very much like the defoliant action found under natural conditions.

*Example 9*

When the foliage of elm trees was sprayed with an acetone solution of 1,4-dihydroxy-2,3-diiodo-2-butene at a rate of 5 pounds per acre, defoliation of the trees was observed.

*Example 10*

The foliage of elm, locust, and oak trees when sprayed with an acetone solution of 1,4-dichloro-2,3-diiodo-2-butene at 5 and 10 pounds per acre was defoliated in all instances.

It will be understood that numerous changes and variations may be made from the above description and examples without departing from the spirit and scope of the invention.

We claim:

1. The process of treating plants to obtain a defoliative effect which comprises contacting said plants with a defoliating amount of material characterized by the structure

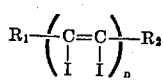

wherein $R_1$ is a member selected from the group consisting of hydrogen, hydroxy methyl and halomethyl, $R_2$ is a member selected from the group consisting of hydroxymethyl and halomethyl and $n$ is an integer from 1 to 2.

2. The process of claim 1 wherein the active agent is

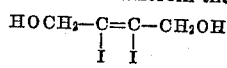

3. The process of claim 1 wherein the active agent is

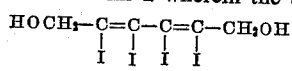

4. The process of claim 1 wherein the active agent is

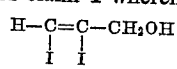

5. The process of claim 1 wherein the active agent is

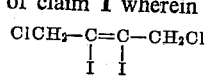

6. The process of claim 1 wherein the active agent is

ClCH$_2$—C=C—CH$_2$OH
         |   |
         I   I

7. The process of claim 1 wherein the active agent is

ICH$_2$—C=C—CH$_2$OH
        |   |
        I   I

8. A defoliating composition comprising a carrier and from 0.1 to 30 percent by weight of said composition of a material having the composition defined by the structure

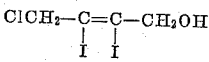

where $R_1$ is a member selected from the group consisting of hydrogen, hydroxymethyl and halomethyl, $R_2$ is a member selected from the group consisting of hydroxymethyl and halomethyl, and $n$ is an integer from 1 to 2.

9. A composition as in claim 8 wherein the agent is

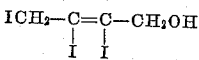

10. A composition as in claim 8 wherein the agent is

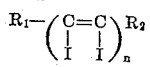

11. A composition as in claim 8 wherein the agent is

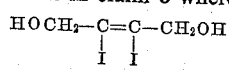

12. A composition as in claim 8 wherein the agent is

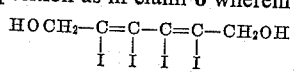

13. A composition as in claim 8 wherein the agent is

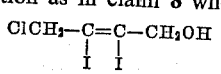

14. A composition as in claim 8 wherein the agent is

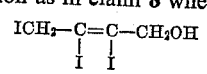

References Cited

UNITED STATES PATENTS

| 2,801,160 | 7/1957 | Iserson | 71—2.7 |
| 3,092,485 | 6/1963 | Duggins | 71—2.7 |
| 3,268,598 | 8/1966 | Iserson | 71—2.3 |

LEWIS GOTTS, *Primary Examiner.*

JAMES O. THOMAS, Jr., *Examiner.*